N. S. ABRAHAMSON.
WAVE POWER.
APPLICATION FILED JAN. 15, 1917.
1,267,733.
Patented May 28, 1918.
2 SHEETS—SHEET 1.
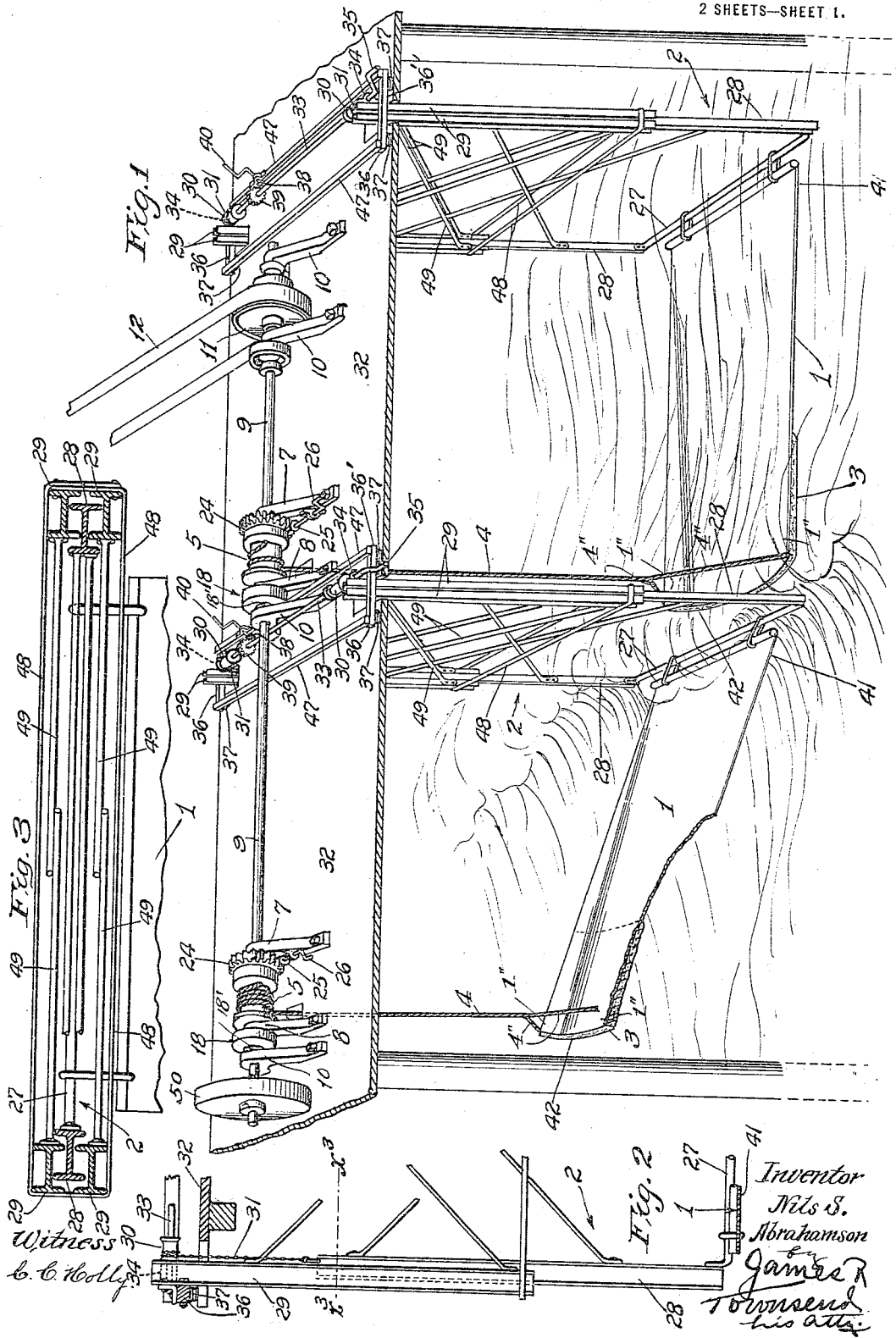

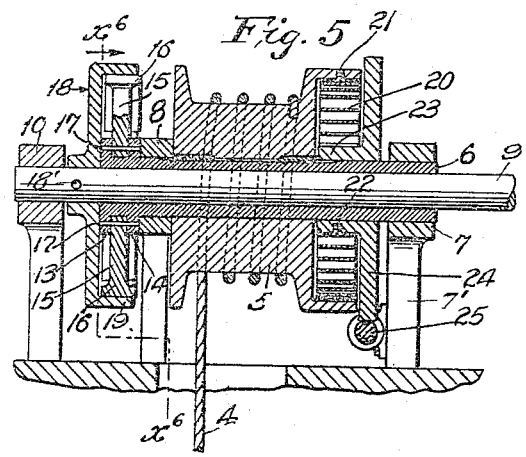

UNITED STATES PATENT OFFICE.

NILS S. ABRAHAMSON, OF LOS ANGELES, CALIFORNIA.

WAVE-POWER.

1,267,733.  Specification of Letters Patent.  Patented May 28, 1918.

Application filed January 15, 1917. Serial No. 142,568.

*To all whom it may concern:*

Be it known that I, NILS S. ABRAHAMSON, a citizen of the United States, residing at Los Angeles, in the county of Los Angeles and State of California, have invented a new and useful Wave-Power, of which the following is a specification.

An object of this invention is to provide a practical wave power adapted to utilize the weight and hydraulic force of the ocean waves.

Objects are strength, durability, simplicity, easy installation, insurance against the destructive effect of the waves, constant driving of power shaft, adjustability to wave height, and ease of installation and repair.

The problem of utilizing the power of ocean waves is recognized as being very difficult, there having been many attempts toward such utilization with the result that at the present time there is no practical power plant whereby the tremendous force of the waves is utilized to any considerable extent, and an object of this invention is to make the utilization of the wave power practical.

It is well known that the force of the ocean waves is very great and that destruction to machines intended to utilize the ocean power has been a practically insurmountable obstruction to success in this line; and an object of this invention is to provide a wave power which will receive the force of the ocean waves in such a way as not to be likely to be destroyed thereby, and yet will transmit to machinery the power from the waves so that the same may be utilized economically and on a large scale.

A principle of this invention is the construction and arrangement of leaves adapted to receive upon their upper surface the portion of an onrushing wave which may be utilized to depress the leaf and to quickly recover the effective position for receiving a succeeding oncoming wave.

The invention includes the construction of the leaf and an arrangement thereof whereby the waves will only act thereupon toward effecting the desired result and without counter-action. It also includes a novel combination of the wave-impelled leaf with the ultimate power element so as to avoid ineffective strains upon the machinery.

An object is to so construct and mount the apparatus that the weight thereof and of the water on the leaf will serve to stabilize the support for the hinged end of the leaf.

The invention also includes parts and combinations of parts which will be hereinafter set forth and claimed.

Other advantages and features of novelty may appear from the accompanying drawings, the subjoined detail description and the appended claims.

The accompanying drawings illustrate the invention as mounted in different ways upon a wharf structure that is shown in a general way only to simplify the view.

Figure 1 is a fragmental perspective elevation of a wave power constructed in accordance with this invention in one of its forms. The wharf is sectioned longitudinally.

Fig. 2 is a fragmental elevation of one of the adjustable supports for the pivoted end of a leaf.

Fig. 3 is a plan section on line $x^3$, Fig. 2, extending entirely across the leaf and leaf support.

Fig. 4 is a fragmental perspective elevation of the invention installed in another form.

Fig. 5 is a fragmental sectional elevation of the take-up mechanism on line $x^5$, Fig. 6.

Fig. 6 is a transverse sectional elevation on line $x^6$, Fig. 5.

The leaf 1 is pivoted behind its rear or wave receiving end, which end is next to the ocean or the oncoming waves; and at its other end is free for oscillation to operate power transmitting mechanism. The leaf is pivoted by any suitable means to a pendent support 2 which may be of any suitable construction and is preferably extensible or telescopic to make the pivotal axis adjustable as to height. The free or unpivoted end of the leaf is preferably provided with a float portion 3 which may be constructed in any desirable way and may serve to assist in starting the leaf on its return to forwardly and upwardly slanting position after a wave has passed. That is to say, it is desirable that the leaf should recover its slanting position as quickly as possible after the force of the waves to depress the same has been expended, and for the purpose of this invention it is immaterial in what direction the water is discharged from the surface of the leaf, and in case the leaf is submerged in the water at the close of the down stroke of the free end of the leaf I have discovered that a material assistance toward returning the leaf to the position for receiving the next wave may be obtained by providing the free end of the leaf with a float to operate toward returning the free end so that the tendency of the submerged leaf will be to assume the inclined position, and I have therefore provided the free end with a float which assists any take-up means which may be provided to lift the free end toward a slanting position above the surface of the water where it will effectively receive the succeeding wave. The power element is arranged extending only forwardly from the horizontal axis on which it is pivoted, so that the power of the wave is all applied to move all of the leaf downward and the leaf is not subject to conflicting forces.

The free end of the leaf is connected by a connection 4 to a drum 5 that is keyed to a sleeve 6 which is mounted on bearings 7, 8, and surrounds the power shaft 9 that in turn is supported in bearings 10 to rotate freely, and is provided with means as a pulley 11 and belt 12 to transmit the power to any suitable machinery for the operation thereof.

The flanges 13, 14 of the sleeve provide seats between them in which the shanks 15 of the clutch dogs 16 are pivoted by pivots 17; and said clutch dogs engage the clutch member 18 that is fixed to shaft 9 by pin 18', and that is provided with an annular flange 19 against the inside of which the dogs impinge.

The spring 20 is fastened at one end by suitable means as the stud 21 to the drum and at the other end by like means 22 to the hub 23 of a gear wheel 24 controlled by the worm 25, journaled on a fixed support 7' and operated by suitable means as the crank 26, the whole constituting a tension device for the spring 20 so as to regulate the take-up as required.

The extensible support 2 is provided with take-up means by which the pivot connection 27 may be raised and lowered relative to the take-up drum so as to accommodate the leaf to the different tide levels.

With this object in view the hangers 28 of the support are in telescopic relation with the upper hangers 29; and a spool 30 and flexible connections 31 are arranged to raise and lower the hangers 28 relative to the wharf 32 or other stationary support for the apparatus. The spools 30 for any one of the adjustable supports 2 are fixed upon a shaft 33 which is journaled by bearings 34 to the upper hangers 29, and may be rotated by the crank 35 to raise and lower the hangers 28.

The upper hangers 29 are provided with arms 36, 36' extending forward and back transversely of the axis of the pivot 27 and supported on opposite sides of the hangers by buffers formed of springs 37 resting on the wharf 32. It will be observed that when the pendent hangers swing forward, the weight of the same is all borne by the ends of the forward arms resting on the forward buffers, and vice versa, upon backward swing. By this means, pendulous movement of the hangers is yieldingly opposed by the weight of the hangers and of the leaf and the water thereon, thus tending to stabilize the pendent support by the forces that would otherwise drive them out of position.

The adjusting shafts 33 may be operated by any suitable means as by the worm 38 and gear 39 which may be operated by suitable means as by power or by a crank 40.

The connection 4 is a single line adapted to be wound around the drum by the action of the take-up spring 20, and said connection 4 is connected by branches 4'' to the front upturned ends of the opposite edges 1'' of the leaf, so that no obstruction is offered to the discharge of the water from the leaf between said edges. The upturned edges 1'' thus form walls gradually deepening from rear to front, the space between said wall gradually narrowing toward the front.

The wave-receiving leaves are preferably flat at their pivot ends which are next to the oncoming wave, as indicated at 41, so that they will receive such wave distributed equally over their entire surface. The front or free ends of the leaves are concave and form open-ended channels, the edges 1'' being turned up, gradually deepening the leaf as the front end is approached, the longitudinal traces of the top side of the leaf being straight, so that a wave is received at its end, and the water as the wave advances is concentrated toward the axis of the leaf, thus preventing the water from flowing off at the sides of the leaf toward the front end thereof to supply pressure to the underside of the leaf, and thus prevent the descent of the front end of the leaf. Since the longitudinal traces of the leaf are straight from end to end of the leaf the water is not impeded and the tendency to drive the float shoreward is minimized, the force of the wave impact being expended in depressing the front end, and thus exerted independently of any other force to rotate the power shaft 9. The momentum and also the deadweight of the wave is thus made to operate the shaft by drawing down the connection 4 and rotating the drum 5, the sleeve 6, clutch dogs 16, clutch member 18 and shaft 9. At each depression of the front end of the leaf, power is stored in the take-up spring 20 and when the water has flowed onward off of the leaf 1, the take-up spring becomes effective to wind up the flexible connection 4 to lift the front end of the leaf into a slanting position to receive the impact of water of the next wave. At the beginning of the return or rising movement of the front end of the leaf, the action of the spring is supplemented by the buoyancy of the float, and this supplementing buoyancy continues so long as the float 3 is acted upon by the upward pressure of the water.

The leaves 1 may be arranged in any series as indicated by the different arrangements in Figs. 1 and 4, and all of the leaves of any series may be connected to a single operative unit as the shaft 9 in Fig. 1 or the belt 43 in Fig. 4.

In said Fig. 4 the shafts 9', 9'' are provided with pulleys 44, 45 connected by a belt 46, and the belt 43 is driven by an extension of the pulley 45 mounted on the shaft 9''.

The upper hangers 29 are connected together at the top by the cross bars 47 fastened to the arms 36, and the worm 39 is carried by said cross bars. The hangers 28 are also connected together by ties 48 and braces 49, so that a practically rigid frame is constructed comprising the hangers 29 and their connections.

The sleeve 6 is supported on bearings 7, 8, independently of the shaft supporting bearings 10, so that the several bearings supplement each other, and the direct pulley connection 4 is directly supported by the bearings 7, 8 without strain upon the shaft and the transmission from the shaft is effected without strain on the sleeve.

The leaves and their pendent supports are arranged in any suitable series to receive the oncoming wave at different periods of time, so that one support may be rising while another support is being depressed by a wave which has just passed the line of the first support. In the arrangement shown in Fig. 1 the leaves are arranged tandem, and the power shaft 9 is shown arranged longitudinally thereabove and is shown provided with a fly-wheel 50, the momentum of which will continue to revolve the shaft 9 while the leaf is rising. The successive action of the leaves, however, also operates to cause continuous motion.

In practical operation the attendant will adjust the lower hanger so that the pivot end of the leaf will be below the crest of the wave from which power is to be received and the take-up will be adjusted to cause the leaf to normally extend thence in position to receive upon its upper surface a body of such wave, so that it will be depressed as desired by the wave body as it moves forward and when properly adjusted each leaf will receive a sufficient amount of the body of the wave to give the power that is desired to be taken off, and in case no power is required to be taken off the leaves may be entirely submerged below effective action of the wave or may be raised up out of the way of the wave.

As that portion of any wave which begins to ride on top of a leaf rolls onto the leaf it is measurably intercepted thereby and the water is thereby retarded while the following trough succeeds the wave crest so that the descending leaf end dumps its charge or weight of water into such trough and is ready to be uplifted by the forward face of the succeeding wave, so that the action of the take-up spring is thereby supplemented.

I claim:

1. In a wave power provided with a drum adapted to be rotated and having take-up means, the combination of a leaf pivotally mounted at one end next to the oncoming wave and having upturned edges forming forwardly deepening walls and a forwardly narrowing space between said walls and having the longitudinal traces of its top side straight, and a flexible connection connected to the front end of said leaf and wound upon the drum to rotate it in opposition to the take-up means.

2. In a wave power provided with a drum adapted to be rotated and having take-up means, the combination of a leaf pivotally mounted at one end next to the oncoming wave and having upturned edges forming forwardly deepening walls and a forwardly narrowing space between said walls and having the longitudinal traces of its top side straight, a flexible connection connected to the front end of said leaf and wound upon the drum to rotate it in opposition to the take-up means; and a flexible connection connected by branches to the front ends of said upturned edges.

3. The wave power leaf set forth, the same being flat at one end and having forwardly deepening upturned edges and a narrowing top between said edges, the longitudinal traces of the top of said leaf being straight.

4. In an ocean power, a power element pivoted at one end below the level of the crest of the wave from which power is to be received and extending thence in position to receive upon its upper surface a body of such wave, and means connected with the other end to transmit power therefrom, said other end being provided with a float to operate toward returning such end from its depressed position.

5. In a wave power the combination of a power shaft journaled to revolve, a fly-wheel on said power shaft, a clutch member fixed to the power shaft, a drum, clutch dogs pivoted to the drum and engaging the clutch member to rotate the same in one direction with the drum, a support, a gear wheel, means connected to the support to adjust the gear wheel, a spring connected to the gear wheel at one end and to the drum at the other end, a flexible connection to rotate the drum, to wind up the spring and to operate the clutch, and a leaf pivoted at one end and connected at the other end to the flexible connection, the pivot end of the leaf being adapted to receive the oncoming waves.

In testimony whereof, I have hereunto set my hand at Los Angeles, California, this 6th day of January, 1917.

NILS S. ABRAHAMSON.

Witness:
JAMES R. TOWNSEND.